United States Patent [19]

Dang

[11] Patent Number: 5,718,357
[45] Date of Patent: Feb. 17, 1998

[54] INDUSTRIAL SYRINGE

[75] Inventor: Nguyen Thai Dang, Glendale, Calif.

[73] Assignee: Courtaulds Aerospace, Burbank, Calif.

[21] Appl. No.: 629,638

[22] Filed: Apr. 9, 1996

[51] Int. Cl.$^6$ ........................................ B67D 5/32
[52] U.S. Cl. .................. 222/153.06; 222/327; 222/386; 222/541.6
[58] Field of Search ............... 222/153.06, 153.07, 222/327, 386, 541.6

[56] References Cited

U.S. PATENT DOCUMENTS

| | | | |
|---|---|---|---|
| 4,651,885 | 3/1987 | Gach | 222/153.64 |
| 5,088,630 | 2/1992 | Arch et al. | 222/386 X |
| 5,165,572 | 11/1992 | Bath | 222/327 X |
| 5,588,562 | 12/1996 | Sander et al. | 222/156.06 |
| 5,622,288 | 4/1997 | Boring | 222/386 X |

Primary Examiner—Joseph Kaufman
Attorney, Agent, or Firm—Gifford, Krass, Groh, Sprinkle, Patmore, Anderson & Citkowski, P.C.

[57] ABSTRACT

A syringe as disclosed having an elongated cylindrical tube open at both a first and second end. The first open end of the tube provides both a filling and dispensing opening for the contents of the tube. A cylindrical piston is slidably mounted within the tube and has a first axial end facing the fill and dispensing opening and a second axial end facing the opposite or second opening. The piston has an outside diameter slightly smaller than the inside diameter of the tube so that an annular clearance space is formed between the tube and the piston. A wiper extends radially outwardly from the second end of the piston and frictionally engages the cylindrical internal surface of the tube. In practice, when the syringe is filled, air is compressed through the annular opening and deflects the wiper such that the air escapes out of the syringe tube. The fill material, however, is sufficiently viscous such that, after air has been expelled from the tube, the viscous material slidably displaces the piston within the interior of the tube. A novel tamper evident cap is also disclosed for closing the second end of the tube.

11 Claims, 2 Drawing Sheets

INDUSTRIAL SYRINGE

BACKGROUND OF THE INVENTION

I. Field of the Invention

The present invention relates to syringes and, in particular, industrial syringes utilized to dispense adhesives, sealants and other industrial compounds.

II. Description of the Prior Art

Industrial syringes of the type utilized to dispense adhesives, sealants and the like are used in many different types of industrial applications. Such syringes, for example, are used by automated machines to dispense adhesives on printed circuit boards for the securing the electronic components to the board itself. Such automated machinery oftentimes dispenses the adhesive at a high repetition rate, typically in excess of 300 adhesive dots per minute.

The previously known industrial syringes typically comprise an elongated tube having a piston slidably mounted within the interior of the tube. The tube is open at both ends and one end of the tube forms a dispensing opening for the syringe. In order to fill the syringe with the industrial liquid, the piston is usually slid through the tube until it is adjacent the dispensing end of the tube. Thereafter, the industrial liquid is injected into the interior of the tube through its dispensing opening. In doing so, the piston actually slides towards the opposite end of the tube until it is filled. This common filling method is known as "neck filled." A cap is then conventionally placed across the end of the tube opposite from its dispensing end in order to protect the contents of the syringe from contamination as well as sealing the tube against leakage. Alternatively, the tube can be filled from its end opposite from the dispensing end.

These previously known industrial syringes, however, suffer from a number of disadvantages. One disadvantage is that air is entrapped within the interior of the tube during the filling operation by the from wiper on the piston. Any air entrapped within the interior of the tube can cause the syringe to "misfire" and fail to eject an application of its contents, e.g. an adhesive dot, during an automated application operation. This, in turn, can lead to electronic components improperly attached, or not attached at all, to printed circuit boards as well as other problems.

A still further disadvantage of these previously known industrial syringes is that a friction fit was typically used to secure the closure cap across the end of the syringe opposite from its dispensing end. These caps, however, would frequently become dislodged from the tube, especially when the syringe was subjected to high temperature variations. Once the cap has been dislodged, contaminants may enter into the contents of the syringe and/or permit leakage of the syringe material from the tube.

Another disadvantage of these previously known closure caps is that they did not provide any means for easy removal. Using a thin, sharp object or fingernail to pry the closure cap off is a potential cause of injury.

A still further disadvantage of these previously known industrial syringes is that the closure cap opposite from the dispensing opening can be removed and replaced without detection. When this occurs, undesirable contaminants can enter into the interior of the tube.

SUMMARY OF THE PRESENT INVENTION

The present invention provides an industrial syringe which overcomes all of the above-mentioned disadvantages of the previously known devices.

In brief, the syringe of the present invention comprises an elongated cylindrical tube having a first opening at one end and a second opening at the opposite end. The first opening forms both an optional fill opening and a dispensing opening for the contents of the tube.

A cylindrical piston is slidably inserted within the tube and has a first axial end which faces the first opening and a second axial end which faces the second opening. Axial movement of the piston within the tube towards the first opening of the tube accordingly dispenses the contents of the tube through the dispensing opening.

The piston has an outside diameter slightly less than the inside diameter of the tube so that an annular clearance space is formed between the piston and the tube. An annular wiper extends radially outwardly from the piston only at the second end of the piston and this wiper frictionally contacts the interior walls of the tube. The elimination of the previously known front wiper on the piston also prevents air entrapment within the syringe during the filling operation.

In practice, the syringe is usually filled from this dispensing opening. As the fill material or liquid, typically a sealant or an adhesive, enters into the interior of the tube, the liquid fills the annular space between the piston and the tube. In doing so, the liquid expels air outwardly from the interior of the tube by compressing the wiper radially inwardly and allowing the air to escape.

After the air has been expelled from the interior of the tube, the relatively viscous liquid causes the piston to move axially from the first end of the tube and towards the second end of the tube. This completes the filling operation.

In order to protect the contents of the tube from contaminants, as well as to protect against leakage of the contents of the syringe, a closure cap is removably disposed across the second end of the tube after the filling operation. This closure cap includes a radially outwardly extending rib which is received within a like shaped channel formed on the interior of the tube thus forming an interlock between the cap and the tube. This interlock prevents displacement of the cap from the tube which might otherwise be caused by differential thermal expansion of the tube and cap.

In order to remove the cap from the tube, a ring is provided exteriorly of the tube around the cap so that one portion of the ring is integrally joined with the cap. The ring is then pulled to remove the cap from the tube.

In order to provide an indication that the cap has been removed from the tube, at least one, and preferably four, frangible links are provided between the ring and the cap. These frangible links are broken whenever the cap is removed from the tube, thus providing a tamper evident indication of the cap removal. These links also help to keep the ring in place.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
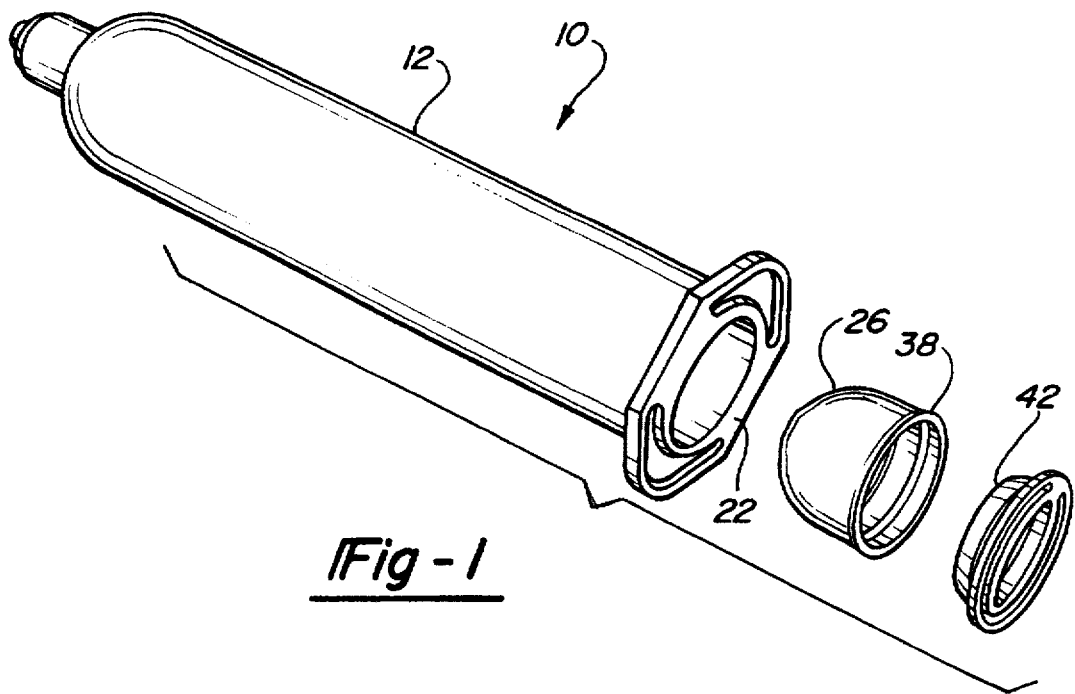
FIG. 1 is an exploded elevational view illustrating a preferred embodiment of the present invention.
Figure 2:
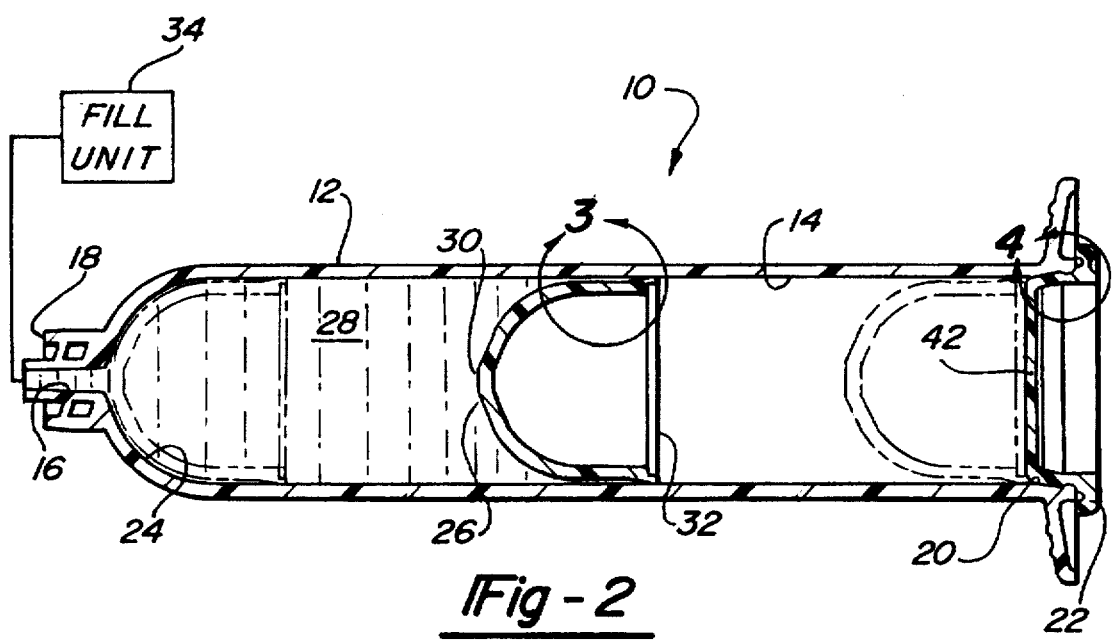
FIG. 2 is a longitudinal sectional view illustrating the preferred embodiment of the invention.

With reference first to FIGS. 1 and 2, a preferred embodiment of the industrial syringe 10 is there shown and comprises an elongated cylindrical tube 12 having a preset internal diameter which forms a cylindrical internal surface 14. The tube 12 is preferably made out of any conventional plastic material, such as polypropylene.

As best shown in FIG. 2, a first opening 16 is formed at a first end 18 of the tube while, similarly, a second opening 20 is formed at the opposite end 22 of the tube 12. The opening 16, however, is much smaller in diameter than the diameter of the interior of the tube. Furthermore, a curvilinear internal surface 24 joins the opening 16 to the cylindrical internal surface 14 of the tube 12.

A piston 26, also preferably made of a plastic material, is axially slidably mounted within the interior 28 of the tube 12 so that one end 30 of the piston 26 faces the opening 16 while the opposite end 32 faces the opening 20. Furthermore, the end 30 of the piston 26 is complementary to the tube internal surface 24 and, as such, is curvilinear in shape.

Still referring to FIG. 2, the tube opening 16 is utilized both as an opening to fill the interior 28 of the tube 12 with an industrial liquid, as well as to dispense the liquid from the tube 12. In order to fill the tube 12 with the industrial liquid, a fill unit 34, illustrated only diagrammatically, is fluidly connected to the tube opening 16. Thus, with the piston adjacent the fill opening 16 as illustrated in the phantom line, industrial liquid from the fill unit 34 is injected into the interior of the tube thus moving the piston to the position shown in solid line in FIG. 2. As more industrial liquid is injected into the interior 28 of the tube 12, the piston 26 is further axially displaced within the interior of the tube to the position shown in phantom line adjacent the second end 22 of the tube 12.

Figure 3:
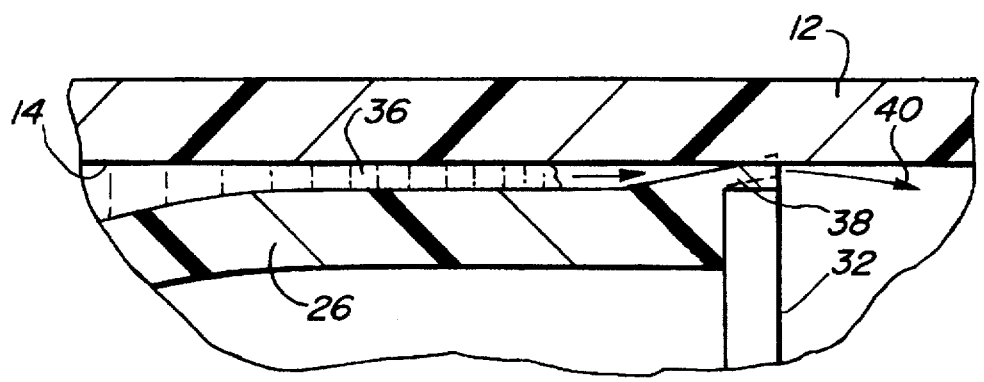
FIG. 3 is a view taken around circle 3—3 in FIG. 2 and enlarged for clarity.

With reference now especially to FIG. 3, the outside diameter of the piston 26 is slightly less than the inside diameter of the tube 12 thus forming a small annular clearance space 36 between the piston 26 and tube 12 along the length of the piston 26. However, in order to seal the piston 26 to the tube 12, a thin walled annular wiper 38 extends radially outwardly from the piston 26 adjacent its rear or second end 32. This wiper 38 contacts the interior cylindrical wall 14 of the tube 12 thus sealing the piston 26 to the tube 12. Preferably the wiper 38 and piston 26 are of a one piece plastic construction.

Still referring to FIG. 3, in practice, the construction of the piston 26 with its wiper 38 enables air to be expelled from the interior 28 of the tube 12 during the filling process. More specifically, during the filling process, the liquid industrial material displaces the air contained between the piston 26 and the fill opening 16 into the annular space 36 between the piston 26 and tube 12. In doing so, the air in the annular space 36 compresses and flexes the wiper 38 radially inwardly so that the air is expelled around the wiper 38 as indicated by arrow 40. Thus, the provision of the single wiper 38 at the rear of the piston 26, together with the elimination of sharp corners; i.e. corners found at very small radii of curvature in both the tube 12 and piston 26, prevents entrapment of air in the syringe 10 during a filling operation.

The viscous industrial liquid, however, after filling the annular space 36 axially displaces the piston 26 so that the piston 26 moves towards the second end 22 of the tube 12 after the air has been expelled from between the piston 26 and the fill opening 16. This axial displacement of the piston 26, furthermore, occurs since the viscous industrial liquid axially displaces the piston 26 before leakage past the wiper 38 occurs. As such, the construction of the piston 26 insures that the air is substantially entirely displaced from the interior of the tube followed by axial displacement of the piston 26.

With reference again to FIGS. 1 and 2, after the tube 12 has been filled with the industrial liquid, a cap 42, preferably constructed of a plastic material such as polyethylene, is inserted into the second end 22 of the tube 12 to both protect the contents of the tube 12 from contaminants as well as prevent leakage from the tube 12 of the contents of the syringe.

Figure 4:
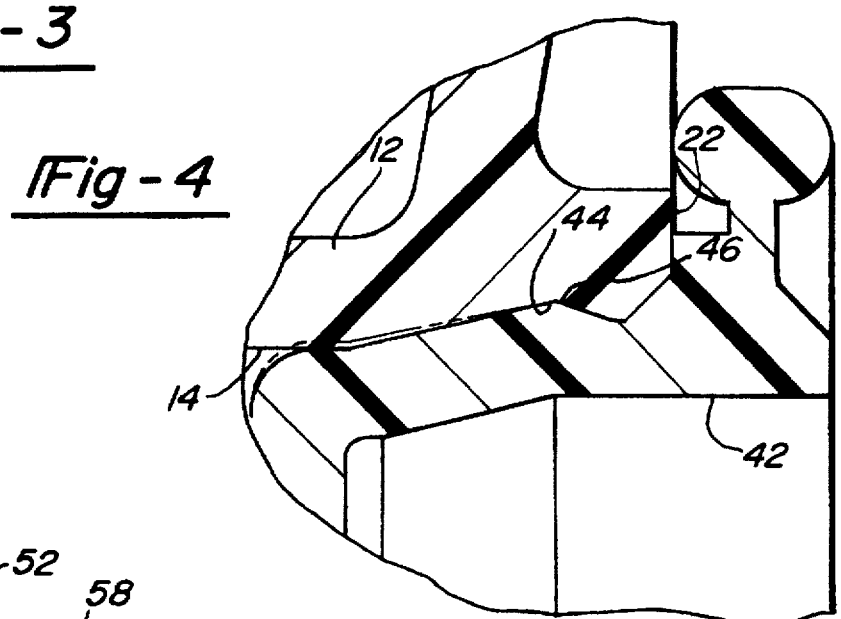
FIG. 4 is a view taken around circle 4—4 in FIG. 2 and enlarged for clarity.

With reference now to FIG. 4, the end 22 of the tube 12 preferably has a radially outwardly extending annular channel 44 formed around its interior surface 14. The cap 42, similarly, includes a radially outwardly extending annular ridge 46 which is complementary in shape to the channel 44 so that, with the cap 42 inserted to its closed position into the end 22 of the tube 12, the ridge 46 and channel 44 interlock with each other. This interlock thus prevents dislodgement of the cap 42 from the tube 12 which might otherwise result from differential thermal expansion of the cap 42 and tube 12.

Figure 5:
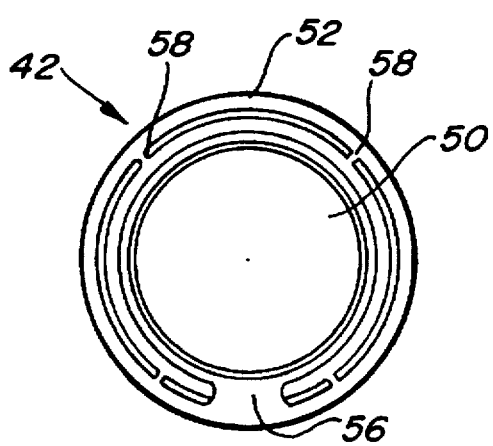
FIG. 5 is an end view of a preferred form of the closure cap for the syringe.
Figure 6:
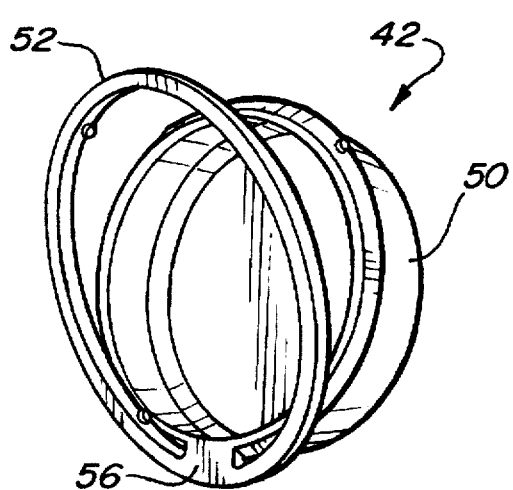
FIG. 6 is an elevational view of the closure cap.

With reference now to FIGS. 5 and 6, the cap 42 preferably includes a cylindrical main body 50 and a pull ring 52. The main body 50 is partially inserted within the end 22 of the tube 12 (FIG. 4) when the cap 42 is moved to its closed position thus sealing the end 22 of the tube 12.

Conversely, the pull ring 52 is positioned exteriorly of the tube 12 and preferably coaxially around the cap main body 50. The main body 50 and pull ring 52 are preferably of a one piece plastic construction and are joined together by a connecting portion 56. Consequently, in order to remove the cap from the housing 12, the pull ring 52 is simply pulled away from the tube 12 thus removing the main body 50 from the tube 12 via the connecting portion 56.

As best shown in FIG. 5, at least one, and preferably severable, frangible links 58 extend between the ring 52 and main body 50 of the cap 42 at a position annularly spaced from the connecting portion 56. These frangible links 58 are broken whenever the pull ring 52 is used to remove the cap 42 from the housing thus providing a tamper evident indication that the cap has been removed.

From the foregoing, it can be seen that the present invention provides an industrial syringe which is greatly advantageous over the previously known devices. In particular, the provision of a single wiper on the rear of the piston together with the elimination of sharp corners in both the tube and piston insures that air is expelled from the interior of the syringe during the filling process. Additionally, the present invention provides a novel closure cap for the syringe, once filled, that interlocks with the syringe until its removal is desired and also provides a tamper evident indicating means that the closure cap has been removed.

Having described my invention, however, many modifications thereto will become apparent to those skilled in the art to which it pertains without deviation from the spirit of the invention as defined by the scope of the appended claims.

I claim:

1. An industrial syringe comprising:

an elongated cylindrical tube having a first opening at one end and a second opening at a second end, said first opening forming both a filling and dispensing opening, said tube having a cylindrical internal surface with a preset inside diameter, a cylindrical piston slidably mounted in said tube, said piston having a first axial end facing said first opening and a second axial end facing said second opening, said piston having an outside diameter slightly less than said preset inside diameter of said tube so that an annular clearance space is formed between said piston and said tube, said piston having a wiper extending radially outwardly and rearwardly only from said second end of said piston, said wiper frictionally and sealingly engaging said cylindrical internal surface of said tube, said wiper forming the only seal between said piston and said inside diameter of said tube.

2. The invention as defined in claim 1 wherein said wiper is made of plastic.

3. The invention as defined in claim 1 wherein said first opening of said tube is smaller in diameter than said preset diameter of said tube, and wherein said tube comprises a curvilinear internal surface extending between said first opening and said cylindrical internal surface of said tube.

4. The invention as defined in claim 3 wherein said first axial end of said piston is complementary to said curvilinear surface of said tube.

5. The invention as defined in claim 1 and comprising a cap for removably closing said second end of said tube.

6. The invention as defined in claim 5 and comprising a radially outwardly extending channel formed on the cylindrical internal surface of said tube adjacent said second end of said tube, said channel having a predefined cross sectional shape, and wherein said cap comprises a radially outwardly extending ridge having a cross sectional shape complementary to said channel, said ridge being received in said channel when said cap closes said second end of said tube.

7. The invention as defined in claim 6 wherein said cap and said tube are constructed of plastic.

8. The invention as defined in claim 7 wherein said tube is made of polypropylene and said cap is made of polyethylene.

9. The invention as defined in claim 5 wherein said cap comprises a main body and a ring, a portion of said main body being positioned within said tube, and said ring being positioned exteriorly of said tube and having a connecting portion secured to said main body.

10. The invention as defined in claim 9 wherein said ring and said main body are of a one piece construction.

11. The invention as defined in claim 9 and comprising at least one frangible link extending between said main body and said ring at a position annularly spaced from said connecting portion.

* * * * *